United States Patent
Laurent et al.

[15] 3,681,405
[45] Aug. 1, 1972

[54] NOVEL 21,21-DICHLOROSTEROIDS
[72] Inventors: Henry Laurent; Karl H. Kolb; Rudolf Wiechert, all of Berlin, Germany
[73] Assignee: Schering Aktiengesellschaft, Berlin, Germany
[22] Filed: July 22, 1970
[21] Appl. No.: 57,334

[30] Foreign Application Priority Data
July 24, 1969 Germany............P 19 38 218.4

[52] U.S. Cl. ..........260/397.3, 260/397.45, 424/242, 424/243
[51] Int. Cl............................................C07c 169/34

[56] References Cited
UNITED STATES PATENTS
3,025,312   3/1962   Fried et al.................260/397.45
3,038,898   6/1962   Bowers et al. ...........260/239.55

Primary Examiner—Henry A. French
Attorney—Millen, Raptes & White

[57] ABSTRACT 21,21-Dichlorosteroids of the formula

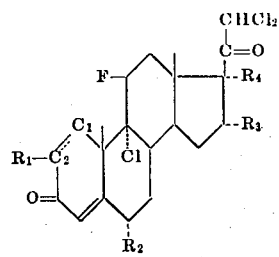

wherein $R_1$ is a hydrogen or chlorine atom; $R_2$ is a hydrogen atom, a fluorine atom, or a methyl group; $R_3$ is a hydrogen atom or a methyl group; $R_4$ is a hydrogen atom or a free or esterified hydroxy group; and $C_1$—$C_2$ represents a single or double bond joining the carbon atoms at the 1- and 2-positions, have anti-inflammatory activity.

13 Claims, No Drawings

NOVEL 21,21-DICHLOROSTEROIDS

BACKGROUND OF THE INVENTION

This invention relates to novel 21,21-dichloropregnanes.

SUMMARY OF THE INVENTION 21,21-Dichloropregnanes of the formula

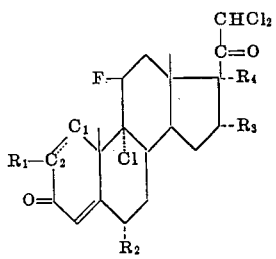

(I)

fault
wherein $R_1$ is a hydrogen or chlorine atom; $R_2$ is a hydrogen atom, a fluorine atom, or a methyl group; $R_3$ is a hydrogen atom or a methyl group; $R_4$ is a hydrogen atom or a free or esterified hydroxy group; and $C_1=C_2$ represents a single or double bond joining the carbon atoms at the 1- and 2-positions, having anti-inflammatory activity, are produced by reacting the corresponding $\Delta^{9(11)}$-21-monochloro steroid with hydrogen fluoride in the presence of positive chlorine.

DETAILED DISCUSSION

Examples of the compounds of this invention are those represented by Formula I wherein a. $R_1$ is H, e.g., those wherein $R_4$ is H or OH;
b. $R_1$ is Cl, e.g., those wherein $R_4$ is H or OH;
c. $R_2$ is F, e.g., those wherein $R_4$ is H or OH;
d. $C_1=C_2$ is a double bond, e.g., those wherein $R_4$ is H or OH; and
e. each of a, b, c and d wherein $R_3$ is $CH_3$.

When $R_4$ is an esterified hydroxy group, the acyl group can be that of an acid which is customarily employed in steroid chemistry for the esterification of free hydroxy groups. Preferred acids are those containing up to 15 carbon atoms, especially lower and medium aliphatic carboxylic acids. Furthermore, the acids can also be unsaturated, branched, polybasic, or substituted in a conventional manner, for example by hydroxy or amino groups, or halogen atoms. Likewise suitable are cycloaliphatic, aromatic, mixed aromatic or heterocyclic acids which can also be substituted in a suitable manner.

Examples of such esters are those wherein $R_4$ is —O—Ac in which Ac is the acyl radical of an organic carboxylic acid containing from 1 to 15 carbon atoms, inclusive, for example, a lower-aliphatic acid, e.g., formic, propionic, butyric, isobutyric valeric, iso-valeric, trimethylacetic, 2-methylbutyric, 2-ethylbutyric, hexanoic, diethylacetic, triethylacetic, heptanoic, octanoic,$\alpha$-ethylisovaleric, which can be optically active, e.g., abietic, an alicyclic acid, e.g., cyclopropylidene acetic, a cycloaliphatic acid, e.g., cyclopentylformic, cyclopentylacetic, $\beta$-cyclopentyl-propionic, cyclohexylformic, cyclohexylacetic, $\beta$-cyclohexylpropionic, an aryl or alkaryl acid, e.g., benzoic, 2,3 or 4-methylbenzoic, 2,3-, 2,4-, 2,5-, 2,6-, 3,4- and 3,5- dimethylbenzoic, ethylbenzoic, 2,4,6-trimethylbenzoic, 2,4,6-triethylacetic, $\alpha$-naphthoic, 3-methyl-$\alpha$-naphthoic, an aralkyl acid, e.g., phenylacetic, phenylpropionic, diphenylacetic, triphenylacetic acid. Preferred are the esters of lower-aliphatic acids containing two to 12 carbon atoms. Also, esters of inorganic acids, such as, for example, of sulfuric and phosphoric acid, can be employed.

It will be apparent that the above-described compounds of this invention wherein $R_4$ is —O—Ac can be produced from the corresponding starting compound of Formula II wherein $R_4$ also is —O—Ac by the process of this invention or from corresponding compound of this invention of Formula I wherein $R_4$ is -OH by esterification techniques known in the art.

In carrying out the process of this invention, a compound of Formula I is produced by the reaction of a starting steroid of the formula

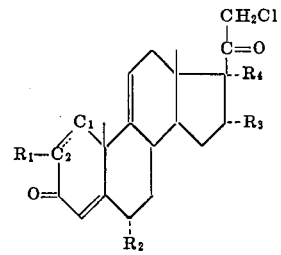

(II)

wherein $R_1$, $R_2$, $R_3$ and $R_4$ and $C_1=C_2$ have the values given above, with hydrogen fluoride in the presence of positive chlorine.

The progression of the process according to the invention was surprising since it would not be expected that, under the conditions of this process, there would simultaneously occur the chlorine-fluorine addition to the $\Delta^{9(11)}$-double bond, and additionally chlorination at the 21-position with resultant formation of the corresponding 21,21-dichloro-compounds.

In carrying out the process of this invention, the starting $\Delta^{9(11)}$-21-chloro steroid and selected N-chloroacylamide or -imide in solid form or dissolved in an inert solvent, is mixed with the hydrogen fluoride.

Suitable inert solvents are liquid-saturated aliphatic and alicyclic and aromatic hydrocarbons, which can also be halogenated, such as, for example methylene chloride, ethylene dichloride, chloroform, hexane, octane, cyclohexane, methylcyclohexane, benzene, toluene, xylene, or ether, e.g., tetrahydrofuran, dioxane, diethyl ether, and the like. Preferred solvents are the halogenated hydrocarbons, especially, methylene chloride or ethylene chloride, and the ethers, especially, tetrahydrofuran and dioxane, and dipolare aprotonic solvents, such as formamide, dialkylformamide, e.g. dimethyl formamide, dialkyl acetamide, e.g. dimethyl acetamide, N-methyl pyrrolid-2-one and acetonitrile.

The reaction is conducted at any convenient temperature, e.g. — 20° C to room temperature or higher, preferably about — 5° C to 0° C. Heating above room temperature is not usually desirable and some cooling usually is employed to maintain the reaction temperature at 15° C or lower, e.g. about 0° C.

The reaction is conducted until the chlorination-fluorination of the $\Delta^{9(11)}$-double bond and replacement of the hydrogen atom in position 21 of the starting steroid is substantially complete, e.g., several hours or longer at 0° C., usually three or more hours.

The chlorine is supplied by a source of positive chlorine, e.g., N-chloroamides and N-chloroimides which preferable are derivatives of mono- and dicarboxylic acids, respectively, containing up to 20 carbon atoms. Included are those of the formulae R—CONHCl, OC—NCl—OC—R' and (R—CO)$_2$NCl wherein R is a monovalent and R' is a divalent saturated or unsaturated hydrocarbon radical of less than 20 carbon atoms. Specific examples are the N-chloro-derivatives of acylamides, e.g., N-chloro-acetamide and N-chloro-imides, e.g., N-chloro-succinimide, -phthalimide, and N-chloroarylamides, e.g., benzamide.

The amount of N-chloro compound employed is about 2 to 4, preferable about 3 moles calculated on one mole of the starting steroid. Especially suitable as the chlorination reactant are N-chlorosuccinimide and N-chloroacetamide.

In the process of this invention, the hydrogen fluoride is preferable substantially anhydrous. It preferably is employed in substantial molar excess to ensure complete reaction. Usually at least about 20 molar equivalents, calculated on the starting steroid, of hydrogen fluoride is employed. The concentration of the hydrogen fluoride in the reaction mixture is not critical and can vary widely.

In a preferred embodiment of the process of this invention, a hydrogen fluoride solution, for example in tetrahydrofuran/methylene chloride or dimethylformamide, is prepared at a low temperature, e.g. at −50°C. The starting steroid (II) and the chlorinating agent, for example N-chlorosuccinimide, are then added to this solution. The thus-produced reaction mixture is then allowed to stand for several hours, e.g., about 16–24 hours, at about 0°C to 30°C.

The order of mixing of the hydrogen fluoride with the starting steroid is not critical. The N-chloro compound should be present at the time of mixing to avoid the production of byproducts. Preferably the starting steroid and N-chloro compound are added to a solution of hydrogen fluoride in the reaction solvent.

The reaction product is worked up in the usual fashion, e.g., by mixing with ice water optionally containing sufficient base, e.g., ammonium hydroxide sodium carbonate or sodium bicarbonate, to neutralize the acid in the reaction mixture; separating the organic phase, removing the solvent and recrystallizing the product.

The starting 21-chloro compounds employed in the process of this invention can be prepared from the corresponding 21-hydroxy $\Delta^{9(11)}$-steroids by conventional procedures. For example the 21-hydroxy-compound can be esterified with methanesulfonic acid chloride in pyridine at 0°C. to produce the 21-mesyloxy ester thereof and then substituting the mesyloxy group in the usual manner with a chlorine atom, preferably in dimethylformamide with lithium chloride (approximately 1 hour at 100°C.) In Table I below are set forth physical data obtained for the thus-produced 21-mesyloxy charging 21-chloro and the intermediates starting 21-hydroxy compounds of this process

TABLE I

| Compound | Melting Point | $[\alpha]_D^{25}$ (CHCl$_3$) | UV Methanol |
|---|---|---|---|
| 6α-Fluoro-21-hydroxy-16α-methyl-4,9(11)-pregnadiene-3,20-dione | 178–178.5°C | +113° | $\epsilon_{235}$=16,500 |
| 6α-Fluoro-21-hydroxy-16α-methyl-1,4,9(11)-pregnatriene-3,20-dione | 174–175°C | +35° | $\epsilon_{238}$=16,800 |
| 6α-Fluoro-2-chloro-21-hydroxy-16α-methyl-1,4,9(11)-pregnatriene-3,20-dione | 199–201°C | −5° | $\epsilon_{246}$=15,700 |
| 17,21-Dihydroxy-1,4,9(11)-pregnatriene-3,20-dione | 229–230.5°C | +24° | $\epsilon_{238}$=14,800 |
| 6α-Fluoro-21-mesyloxy-16α-methyl-4,9(11)-pregnadiene-3,20-dione | oily | +111° | $\epsilon_{235}$=16,100 |
| 6α-Fluoro-21-mesyloxy-16α-methyl-1,4,9(11)-pregnatriene-3,20-dione | 150–151°C | +41° | $\epsilon_{238}$=17,000 |
| 6α-Fluoro-2-chloro-21-mesyloxy-16α-methyl-1,4,9(11)-pregnatriene-3,20-dione | 197–199°C | +8° | $\epsilon_{246}$=15,600 |
| 17-Hydroxy-21-mesyloxy-1,4,9(11)-pregnatriene-3,20-dione | 153–155°C | +51° | $\epsilon_{239}$=15,300 |
| 6α-Fluoro-21-chloro-16α-methyl-4,9(11)-pregnadiene-3,20-dione | 145–146°C | +142° | $\epsilon_{235}$=16,500 |
| 6α-Fluoro-21-chloro-16α-methyl-1,4,9(11)-pregnatriene-3,20-dione | 205–206.5°C | +72° | $\epsilon_{239}$=16,300 |
| 6α-Fluoro-2,21-dichloro-16α-methyl-1,4,9(11)-pregnatriene-3,20-dione | 185–187°C | +29° | $\epsilon_{245}$=15,700 |
| 21Chloro-17-hydroxy-1,4,9(11)-pregnatriene-3,20-dione | 189–192°C | +63° | $\epsilon_{239}$=14,800 |

The novel compounds of this invention possess excellent topical anti-inflammatory activity. Such activity can be shown clinically by the skin blanching vasoconstriction test for topical anti-inflammatory activity. Table II below shows the activity of two compounds of this invention (II and III) and, for comparison, the known anti-inflammatory agent 6α-fluoro-11β,21-dihydroxy-16α-methyl-1,4-pregnadiene-3,20-dione (I), in this test. This activity of the compounds of this invention was most surprising, since the compounds of this invention lack a free or esterified hydroxy group in the 11- and 21-positions. Moreover, such a group in the 17α-position is unnecessary for the maintenance of activity.

The vasoconstriction test utilized to show clinically the high activity of the compounds of this invention as topical anti-inflammatory agents was conducted as follows: On the backs of male patients (18–38 years), the stratum corneum was divided by the application and tearing off of an adhesive film having a width of 2 cm., which application was conducted 20 times at the same spot. As a result, a pronounced hyperemia was thus produced. Then, within the stripped area, under the same application of pressure, approximately 50 mg. of a water/oil salve base containing, in each case, respectively 0.1 percent or 0.01 percent of the compound being evaluated for activity are applied to marked 4 cm² areas. The backs of the patients were then photographed at specific intervals with color film (Kodak). In order to evaluate hyperemia and vasoconstriction, the color of the individual zones of the skin on the Kodak color film were translated into brightness values. This was done by projecting sections of the color film through a perforated screen on an interference filter. Such sections differ from one another in brightness depending on the degree of vasoconstriction obtained at that section. As the brightness indicator, a secondary electron multiplier was employed, and for determining the chromaticity value, the anode current of the secondary electron signal was measured. To determine the vasoconstriction effect, which is a representative syndrome of topical anti-inflammatory effectiveness, there was measured onset of effect, degree of effectiveness, and duration of effect. The chromaticity value of the treated and untreated stripped skin was determined and compared with the chromaticity value of the normal skin, the chromaticity value of the normal skin being assigned the value 100 and the chromaticity value of the untreated stripped skin was assigned the value 0. Slight, medium, and high vasoconstriction effects were evaluated between 0 and 100.

TABLE II

| No. | Compound | Dosage in % | observation time in hours | | | | | |
|---|---|---|---|---|---|---|---|---|
| | | | 1 | 2 | 3 | 4 | 5 | 6 |
| I | 6α-fluoro-11β,21-dihydroxy-16α-methyl-1,4-pregnadiene-3-20-dione | 0.1 | 5 | 35 | 65 | 100 | | |
| | | 0.01 | 0 | 20 | 40 | 50 | — | 100 |
| II | 6α,11β-Difluoro-9,21,21-trichloro-16α-methyl-1,4-pregnadiene-3,20-dione | 0.1 | 15 | 50 | 85 | 100 | | |
| | | 0.01 | 15 | 55 | 85 | 100 | | |
| III | 6α,11β-Difluoro-2,9,21,21-tetrachloro-16α-methyl-1,4-pregnadiene-3,20-dione | 0.1 | 10 | 35 | 80 | 100 | | |
| | | 0.01 | 5 | 15 | 60 | 90 | 100 | |

The experimental results represented in Table II show that with the compounds of this invention, in addition to attaining an earlier onset of effectiveness, the desired maximum of effectiveness is likewise reached more quickly than in the case of the comparison compound. Moreover, the intensity of effectiveness of the novel compounds is higher throughout during the period of effect than in the case of the comparison compound. Moreover, the side effects caused under the influence of the compounds of this invention are desirably minor.

The novel compounds of this invention are useful for the treatment of a variety of inflammatory conditions, e.g., a. topical administration: variety of types of eczemas, neurodermitis, erythrodermia, first-degree burns, pruritus vulvae and ani, rosacea, erythematodes cutaneus, psoriasis, lichen ruber planus, verrucosus and contact dermatitis;

b. oral administration: acute and chronic polyarthritis, neurodermitis, bronchial asthma, hay fever, and others.

The compounds can be employed in the treatment of inflammatory conditions formulated in conventional pharmaceutically acceptable carriers in the forms customarily employed in pharmaceuticals. For oral administration, especially suitable are tablets, dragees, capsules, pills, suspensions and solutions. Suitable excipients for tablets are, for example, lactose, amylose, talc, gelatin, magnesium stearate, and the like.

For topical administration, suitable are powders, solutions, suspensions, aerosols, and vaginal suppositories. For parenteral application, aqueous and oily solutions or suspensions can be employed.

The compounds of this invention are formulated so as to provide, for example 1–150 mg. of the effective agent in admixture with 20 mg. to 5 g. of a pharmacologically indifferent excipient, i.e., a pharmaceutically acceptable carrier, per unit dosage, e.g., per tablet.

The novel effective agents are usually administered topically at concentrations in the pharmaceutical carrier of between 0,02 and 0,5 percent, preferably 0,05 to 0,2 percent.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The unknown $\Delta^{9(11)}$-2.21-dichloro steroid employed as starting product according to example 3 can be produced as follows:

a. A solution of 25.0 g. of 6α-fluoro-11β-hydroxy-21-acetoxy-16α-methyl-1.4-pregnadiene-3.20-dione in 125 ml of tetrahydrofuran and 250 ml of methylene chloride is mixed at −10° C with 50 g. N-chlorosuccinimide and 62,5 ml of dioxan satured with hydrochloric acid. After 10 minutes the batch is poured into water, extracted with methylene chloride, and the extract is washed with a sodium sulfite-, a sodium hydrogen carbonate solution and with water. After evaporation of the solvent the crude product is chromatographed on silica gel with 1.3 − 1.9 percent acetone-methylene chloride to furnish 5,95 g. 6α-fluoro-1α,2β-dichloro-11β-hydroxy-21-acetoxy-16α-methyl-4-pregnene-3.20-dione, m.p. 177° − 178° C (from acetone-hexane) $[\alpha]_D^{25} = +120°$ (chloroform).

UV: $\epsilon_{246} = 13\,100$ (methanol).

b. A mixture of 5.9 g. of 6α-fluoro-1α,2β-dichloro-11β-hydroxy-21-acetoxy-16α-methyl-4-pregnadiene-3.20-dione, 29.5 ml of dimethylformamide, 5.9 g. of pyridine and 2.95 ml of methane sulfonic acid chloride is heated for 80 minutes under nitrogen, allowed to cool and poured into water. The isolated precipitate is chromatographed on silica gel. After elution with 2.2 − 3.6 percent acetone-methylene chloride 3.43 g. of 6α-fluoro-2-chloro-21-acetoxy-16α-methyl-1.4.9(11)-pregnatriene-3.20-dione is obtained, m.p. 161° − 162° C (from acetone-hexane); $[\alpha]_D^{25} = +16°$ (chloroform).

UV: $\epsilon_{245} = 16\,000$ (methanol).

c. A solution of 23.5 g. of 6α-fluoro-2-chloro-21-acetoxy-16α-methyl-1.4.9(11)-pregnatriene-3.20-dione in 235 ml of methylene chloride is mixed with 235 ml of a 0.2 N potassium hydroxide solution in methanol. After stirring for 15 minutes at room temperature and addition of water the separated organic phase is washed neutral, dried and concentrated under vacuum. The crude product is recrystallized from acetone-hexane to yield 11.65 g. of 6α-fluoro-2-chloro-21-hydroxy-16α-methyl-1.4.9(11)-pregnatriene-3.20-dione, m.p. 199°–201° C.

$[\alpha]_D = -5°$.

UV: $\epsilon_{246} = 15\,700$.

d. At 0° C, 2.0 g. of 6α-fluoro-2-chloro-21-hydroxy-16α-methyl-1.4.9(11)-pregnatriene-3.20-dione dissolved in 40 ml of pyridine is reacted with 1.0 ml methane sulfonic acid chloride. The reaction mixture is stirred for 30 minutes at 0° C and poured into ice-water the precipitate dissolved in methylene chloride. The crude product is chromatographed. After elution with 15 – 17 percent acetone-pentane 1.56 g. of 6α-fluoro-2-chloro-21-mesyloxy-16α-methyl-1.4.9(11)-pregnatriene-3.20-dione is obtained, m.p. 197° – 199° C (from acetone-hexane).

$[\alpha]_D = +8°$.

UV: $\epsilon_{246} = 15\,600$.

e. A solution of 6.0 g. of 6α-fluoro-2-chloro-21-mesyloxy-16α-methyl-1.4.9(11)-pregnatriene-3.20-dione in 90 ml of dimethylformamide is mixed with 12 g. of lithiumchloride and stirred for 16 hours at 100° C, the product is precipitated by pouring into water and isolated by extraction with methylene chloride. The crude product is chromatographed. After elution with 7.4 – 10 percent acetonepentane 2.34 g. of 6α-fluoro-2.21-dichloro-16α-methyl-1.4.9(11)-pregnatriene-3.20-dione is obtained, m.p. 185° – 187° C (from acetone-hexane).

$[\alpha]_D = +29°$.

UV: $\epsilon_{245} = 15\,700$.

The starting products according to example 1 and 2 can be produced from 16α-methyl-6α-fluoro-4-pregnene-11β,21-diol-3.20-dione-21-acetate (obtained from 21-OH esterification with acetic anhydride/pyridine), according to example 4 from prednisolon-21-acetate and according to example 5 from 6α-methyl-prednisolon-21-acetate.

In all cases the introduction of the 9.11-double bond and the substitution of the 21-hydroxyl group by a chloro atom are produced analogously to the methods as mentioned above (c to e).

EXAMPLE 1

At −50°C., 5 ml. of anhydrous hydrogen fluoride is mixed with 7.5 ml. of tetrahydrofuran and 10 ml. of methylene chloride. In this mixture, 5.0 g. of 6α-fluoro-21-chloro-16α-methyl-4,9(11)-pregnadiene-3,20-dione, as well as 5.0 g. of N-chlorosuccinimide are dissolved, and the reaction mixture is allowed to stand for 24 hours at about 0°C. Then, the mixture is poured into ice water containing sodium bicarbonate and sodium sulfite dissolved therein. The thus-precipitated substance is filtered off, dissolved in methylene chloride, the solution washed with water, dried over sodium sulfate, and evaporated under a vacuum. The residue is chromatographed on silica gel. After elution with 6.8 – 8.2 percent of acetone/pentane, 1.33 g. of 6α,11β-difluoro-9,21,21-trichloro-16α-methyl-4-pregnene-3,20-dione is obtained, m.p. 204°–205°C. (from acetone/hexane). UV: $\epsilon_{233} = 16\,400$ (methanol); $[\alpha]_D^{25} = +154°$ (chloroform).

EXAMPLE 2

2.0 g. of 6α-fluoro-21-chloro-16α-methyl-1,4,9(11)-pregnatriene-3,20-dione is reacted, as described in Example 1, with hydrogen fluoride and N-chlorosuccinimide. The crude product is chromatographed on silica gel. After elution with 8.5 – 11 percent acetone/pentane, 1.52 g. of 6α,11β-difluoro-9,21,21-tri-chloro-16α-methyl-1,4-pregnadiene-3,20-dione is obtained, m.p. 224°–226°C. (from acetone/hexane); $[\alpha]_D^{25} = +123°$ (chloroform); UV: $\epsilon_{236} = 15\,700$ (methanol).

EXAMPLE 3

2.0 g. of 6α-fluoro-2,21-dichloro-16α-methyl-1,4,9(11)-pregnatriene-3,20-dione is reacted, as described in Example 1, with hydrogen fluoride and N-chlorosuccinimide. The crude product is chromatographed on silica gel. After elution with 3.9 – 6.3 percent acetone/pentane, 640 mg. of 6α,11β-difluoro-2,9,21,21-tetrachloro-16α-methyl-1,4-pregnadine-3,20-dione is obtained, m.p. 202°–206°C. (from acetone/hexane). $[\alpha]_D^{25} = +84°$ (chloroform); UV: $\epsilon_{243} = 15\,300$ (methanol).

EXAMPLE 4

4.0 g. of 21-chloro-17-hydroxy-1,4,9(11)-pregnatriene 3,20-dione are reacted, as described in Example 1, with hydrogen fluoride and N-chlorosuccinimide. The crude product is chromatographed on silica gel. After elution with 4.5 – 5.5 percent acetone/methylene chloride, 1.18 g. of 11β-fluoro-9,21,21-trichloro-17α-hydroxy-1,4-pregnadiene 3,20-dione is obtained, m.p. 235°–236°C. (from acetone/hexane). $[\alpha]_D^{25} = +136°$ (chloroform); UV $\epsilon_{236} = 15\,300$ (methanol),

EXAMPLE 5

Following the procedure of example 1 21-chloro-17-hydroxy-6α-methyl-1,4,9(11)-pregnatriene-3,20-dione is converted to 11β-fluoro-9,21,21-trichloro-17-hydroxy-6α-methyl-1,4-pregnadiene-3,20-dione.

EXAMPLE 6

One g. 11β-fluoro-9,21,21-trichloro-17α-hydroxy-6α-methyl-1,4-pregnadiene-3,20-dione is esterified with 5 ml acetic anhydride and 0,1 g. p-toluolsulfonic acid. After 5 hours at room temperature is obtained 880mg. of 11β-fluoro-9,21,21-trichloro-17α-acetoxy-6α-methyl-1,4-pregnadiene-3,20-dione.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

WHAT IS CLAIMED IS:
1. A 21,21-dichloropregnane of the formula

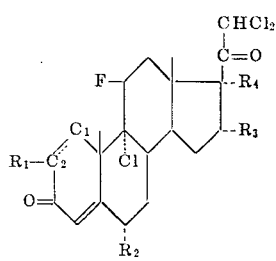

wherein $R_1$ is a hydrogen or chlorine atom; $R_2$ is a hydrogen atom, a fluorine atom, or a methyl group; $R_3$ is a hydrogen atom or a methyl group, $R_4$ is a hydrogen atom or a free or esterified hydroxy group, and $C_1=C_2$ represents a single or double bond.

2. A compound of claim 1 wherein $R_1$ is H.
3. A compound of claim 1 wherein $R_1$ is Cl.
4. A compound of claim 1 wherein $R_2$ is F.
5. A compound of claim 1 wherein $C_1=C_2$ is a double bond.
6. A compound of claim 4, 6α,11β-difluoro-9,21,21-trichloro-16α-methyl-4-pregnene-3,20-dione.
7. A compound of claim 4, 6α,11β-difluoro-9,21,21-trichloro-16α-methyl-1,4-pregnadiene-3,20-dione.
8. A compound of claim 4, 6α,11β-difluoro-2,9,21,21-tetrachloro-16α-methyl-1,4-pregnadiene-3,20-dione.
9. A compound of claim 5, 11β-fluoro-9,21,21-trichloro-17α-hydroxy-1,4-pregnadiene-3,20-dione.
10. Process for the preparation of a 21,21-dichloropregnane of claim 1 which comprises reacting a steroid of the formula

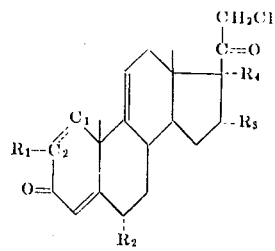

wherein $R_1$, $R_2$, $R_3$, $R_4$ and $C_1=C_2$ have the values given above, with hydrogen fluoride in the presence of an N-chloro-acylamide or chloroimide and a reaction solvent.

11. A process according to claim 9 wherein the reaction is conducted for a period of at least 3 hours.
12. A compound of claim 5, 11β-fluoro-9,21,21-trichloro-17-hydroxy-6α-methyl-1,4-pregnadiene-3,20-dione.
13. A compound of claim 5, 11β-fluoro-9,21,21-trichloro-17-acetoxy-6α-methyl-1,4-pregnadiene-3,20-dione.

* * * * *